3,022,295
16β-DIFLUORINATED CORTICOSTEROIDS
AND INTERMEDIATES
Rudolph G. Berg, New London, and Gerald D. Laubach, Niantic, Conn., assignors to Chas. Pfizer & Co., Inc., New York, N.Y., a corporation of Delaware
No Drawing. Filed Nov. 2, 1959, Ser. No. 850,039
10 Claims. (Cl. 260—239.55)

The present invention relates to steroid compounds and is more particularly concerned with 16β-fluorinated corticosteroids and 21-esters thereof, to novel intermediates in the production thereof and a process for the production of the novel compounds and the novel intermediates.

This application is a continuation-in-part of our earlier filed copending United States patent application Serial Number 801,002; filed March 23, 1959.

It has now been found that 16β-fluorinated corticosteroids and the 21-esters thereof possess valuable anti-inflammatory, anti-rheumatoid arthritic and glucocorticoid activities to a remarkable degree. The 16β-fluorinated corticosteroids of this invention have been found to possess these valuable therapeutic activities to a much higher degree than the heretofore available 16-halogenated corticosteroids.

These compounds are also useful in the treatment of inflammatory conditions of the skin, ears and eyes of humans and of valuable domestic animals as well as contact dermatitis and other allergic reactions. Compositions containing the valuable compounds of the present invention can be prepared for administration to humans or animals in conventional dosage forms, such as, pills, tablets, capsules, solutions, elixirs, or syrups for oral use, or in liquid forms which are adaptable to the natural and synthetic cortical steroid hormones for injectable products. The novel steroids can also be administered topically in the form of ointments, creams, and the like.

The fluoro atom can be easily and economically introduced into the 16β-position of the steroid molecule to give 16β-fluorinated steroids which possess the complete corticosteroid side chain. The essential feature of the process of this invention resides in protecting the corticosteroid side chain of, for example, a 16β-bromo corticosteroid by conversion to the 17,20; 20,21-bismethylenedioxy derivative. The thus protected compound is then reacted with silver fluoride to give the corresponding 16β-fluorinated corticosteroid 17,20; 20,21-bismethylenedioxy derivative from which the 17,20; 20,21-bismethylenedioxy function can easily be removed as is described in our copending and concurrently filed patent application Serial No. 850,032 entitled "16-Fluorinated Corticosteroids."

The novel compounds of the present invention may be illustrated by the generic formula:

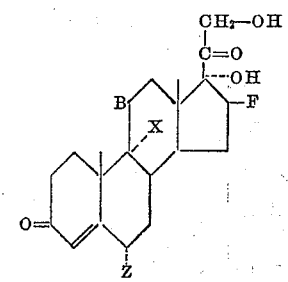

and the $\Delta^1$-dehydro analogs thereof wherein X is selected from the group consisting of hydrogen and fluorine; B is selected from the group consisting of carbonyl and β-hydroxymethylene radicals; Z is selected from the group consisting of fluorine and chlorine; and the 21-acylates thereof wherein the acyl radical is that of a hydrocarbon carboxylic acid containing from one to eight carbon atoms, inclusive.

The novel compounds of the present invention can be prepared by the following reaction sequence wherein the various symbols have the same significance as above:

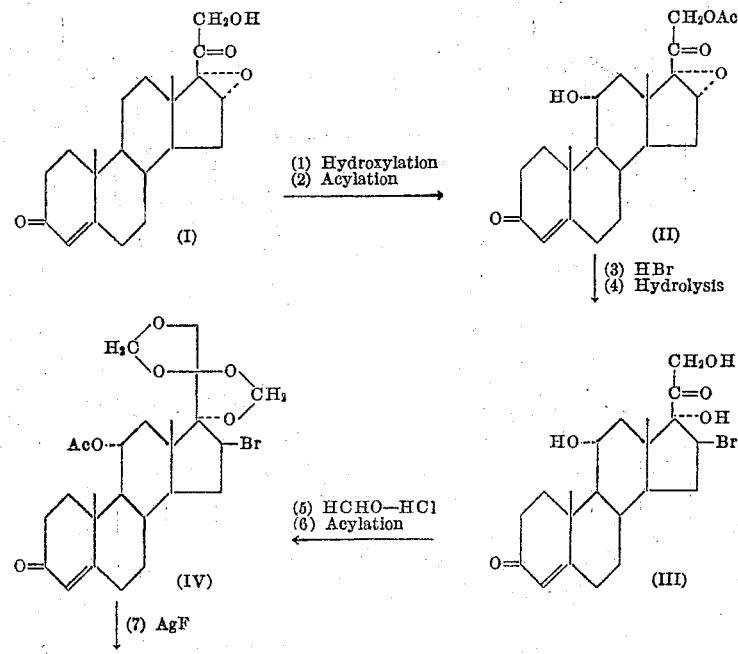

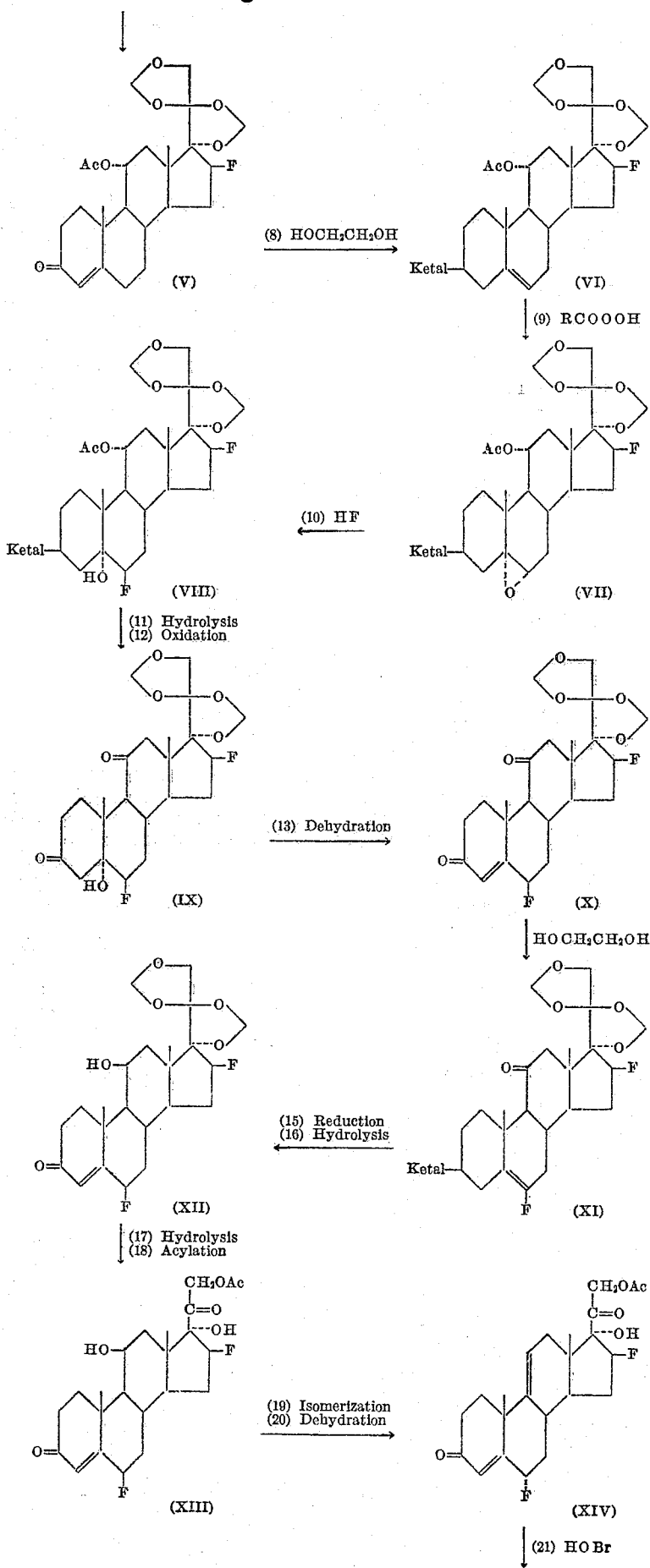

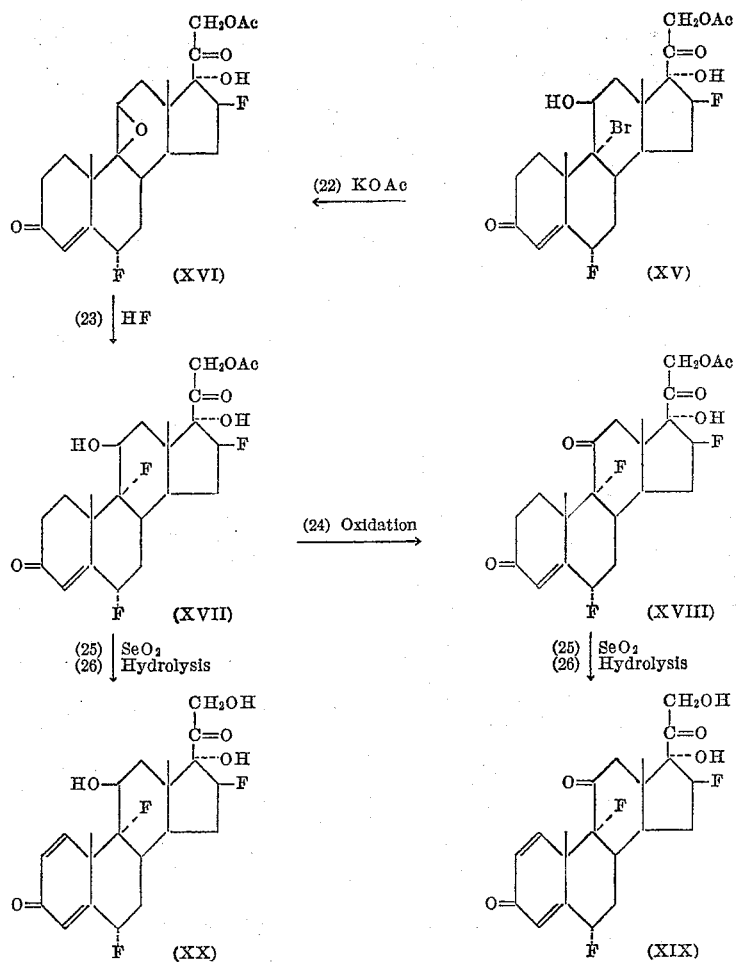

The process of the present invention may be practiced in general by microbiological hydroxylation of 16α,17α-oxido-desoxycorticosterone (I) at the 11-position to produce the corresponding 11-hydroxyl derivative which is acylated to the 21-ester (II). Cleavage of the epoxide ring of the thus produced 16α,17α-oxido-11-epicorticosterone with a halogenating agent, other than a fluorinating agent, such as, hydrogen chloride, hydrogen bromide or hydrogen iodide in gaseous or solution form, or a metal halide, other than a metal fluoride, which releases hydrogen halide when treated with acids produces the corresponding halohydrin acylate. Acid hydrolysis of the thus produced halohydrin acylate gives the corresponding 16β-halo-11-epihydrocortisone (III). Treatment of the said halohydrin with formaldehyde-hydrogen halide produces the corresponding 16β-halo-17,20; 20,21-bismethylenedioxy compound (IV) which is then acylated at the 11-position. Reaction of the thus produced 16β-halo-17,20; 20,21-bismethylenedioxy 11α-acylate compound with silver fluoride yields the corresponding 16β-fluoro-11-epihydrocortisone-17,20; 20,21-bismethylenedioxy derivative 11-acylate (V) which on ketalization yields the corresponding 3-ketal-Δ⁵-pregnene derivative (VI). Epoxidation of the thus produced Δ⁵-pregnene derivative produces the corresponding 5α,6α-epoxide (VII) which on treatment with a fluorinating agent yields the corresponding halohydrin (VIII). Hydrolysis of the said halohydrin followed by oxidation yields the corresponding 17,20; 20,21-bismethylenedioxy derivatives of 3,11,20-triketo - 5α,17α,21 - trihydroxy - 6β,16β - difluoro - allopregnane (IX). Dehydration at the 4,5-positions produces the corresponding 6β,16β-difluoro-cortisone-17,20; 20,21-bismethylenedioxy derivative (X) which can then be hydrolyzed to remove the bismethylenedioxy function, acylated and isomerized to the corresponding 6α,16β-difluoro cortisone-21-acylate. Reduction of the 11-keto group of the 3-ketalized derivative of 6,16β-difluoro-cortisone-17, 20; 20,21-bismethylenedioxy derivative (XI) followed by partial hydrolysis gives the corresponding 6β,16β-difluorohydrocortisone-17,20; 20,21-bismethylenedioxy derivative (XII). Removal of the bismethylenedioxy function of the said 6β,16β-difluoro-hydrocortisone followed by acylation produces the corresponding 21-acylate (XIII) which is then isomerized to the corresponding 6α,16β-difluoro hydrocortisone. Oxidation of the said 6α,16β-difluoro-hydrocortisone compound gives the corresponding 6α,16β-difluoro-cortisone compound. Dehydrogenation of the said difluoro hydrocortisone and difluoro cortisone produces the corresponding 6α,16β-difluoro-prednisolone and 6α,16β-difluoro-prednisone.

6α,9α,16β-trifluoro corticosteroids of the present invention can be prepared in general by dehydrating the 6α,16β-difluoro-hydrocortisone 21-acylate at the 9,11-positions to produce the corresponding Δ⁹⁽¹¹⁾-pregnadiene compound (XIV), followed by treatment of the said Δ⁹⁽¹¹⁾-compound with a hypohalogenating to give the 9α-halo-11β-hydroxy derivative (XV). Treatment of the said halohydrin with an alkali acetate produces the corresponding 9β,11β-oxide (XVI) which on treatment with a fluorinating agent produces the corresponding trifluoro hydrocortisone compound (XVII). Oxidation of the thus produced trifluoro hydrocortisone compound yields the corresponding trifluoro cortisone compound (XVIII). Dehydrogenation of (XVII and XVIII) produces the corresponding trifluoro-prednisolone or trifluoro-prednisone derivatives (XX and XIX).

For purposes of illustration the 6α-fluoro derivatives are given. However, the analogous 6α-chloro derivatives are also included within the scope of this invention. They are obtained by substitution of hydrogen chloride for hydrogen fluoride in the above reaction sequence.

Also included within the purview of this invention are modifications of the illustrated process which comprise using as starting material a compound obtainable as an intermediate product at any stage of the process and carrying out the remaining process steps. The order of the various steps can be varied considerably as will be recognized and appreciated by those skilled in the art.

It is an object of the present invention to provide novel 16β-fluorinated corticosteroids. A further object of this invention is to provide novel intermediates of the 16β-fluorinated corticosteroids of the instant invention. Another object of the present invention is to provide novel 6α,16β - difluorinated - 17α,21 - dihydroxy - 3,20 - diketo steroids. Still another object of the present invention is to provide a process for the production of these novel 6α,16β-difluorinated corticosteroids. Other objects will be apparent to those skilled in the art to which this invention pertains.

In carrying out the process of the present invention the 16α,17α-oxido-desoxycorticosterone (I) is converted to the corresponding 11-hydroxyl derivative by microbiological oxidation. Depending upon the particular microorganism used, an 11β-hydroxyl or an 11α-hydroxyl group can be introduced into the steroid molecule. In the preferred embodiment of this invention, the 16α,17α-oxido-desoxycorticosterone is contacted with the oxygenating activity of an organism of the genus Pestolatia in an aqueous nutrient medium as described by Shull et al., in U.S. Patent 2,721,163 to produce the corresponding 16α,17α-oxido-11-epicorticosterone. The product is then acetylated in accordance with known procedures to the 21-acetate derivative (II).

The thus-produced 16α,17α-oxido-11-epicorticoterone 21-acetate is converted to the corresponding halohydrin by treatment with a halogenating agent, such as, hydrogen chloride, hydrogen bromide, hydrogen iodide. In the preferred embodiment of this invention, the 16α,17α-oxido-11-epicorticosterone 21-acetate is dissolved in acetic acid and treated at about room temperature with a solution of about 30 to 40 percent hydrobromic acid in acetic acid. The reaction time is generally between 5 minutes and 4 hours, after which the reaction product is recovered in a conventional manner, such as, for example, by adding water to the reaction mixture to precipitate 16β-bromo-11-epihydrocortisone 21-acetate.

The 21 acetoxy-halohydrin thus produced is hydrolyzed under mild acid conditions at about room temperature. The reaction time is generally from a few hours to up to 3 days depending upon the particular compound. In the preferred embodiment of this invention, the said 21-acetoxy-halohydrin is dissolved in chloroform and methanol and hydrolyzed with hydrochloric acid of 20 to 37% concentration. The resulting 16β-bromo-epihydrocortisone is isolated from the hydrolysis mixture by evaporation under reduced pressure with simultaneous addition of water and purified if desirable by recrystallization from a suitable organic solvent.

The thus-produced 16β - bromo - 11 - epihydrocortisone (III) is combined with formaldehyde-hydrogen chloride or formaldehyde hydrogen-bromide at room temperature to produce the corresponding 17,20; 20,21-bismethylenedioxy derivative of the side chain. The reaction time is generally from 4 to 72 hours depending upon the compound being treated. Polymers of formaldehyde can also be used in place of aqueous formaldehyde but the formaldehyde-hydrogen chloride is the preferred reagent. In the preferred embodiment of this invention, a methylene chloride solution of the said halohydrin is treated with equal volumes of 37% aqueous formaldehyde and of 37% hydrochloric acid and the two phase system rapidly stirred at room temperature for several hours, generally, from 10 to 48 hours. The methylene chloride which may gradually be distilled off during this period may be replaced by about 4 to 6 volumes of hexane. The bismethylenedioxy derivative of the 16β-bromo compound is then isolated by separating the two liquid phases, extracting the aqueous layer with a suitable organic solvent and washing the combined organic solutions successively with four portions of water in the proportions of about 1 to 2 volumes of water per volume of organic solution. The hexane solution is then dried with anhydrous magnesium sulfate or other suitable drying agent, filtered and evaporated under reduced pressure to give the crude 17,20; 20,21-bismethylenedioxy derivative of 16β-bromo-11-epihydrocortisone. Purification is accomplished by recrystallization from a suitable organic solvent system, such as, methylene chloride-methanol or ether.

The 16β-bromo-17,20; 20,21-bismethylenedioxy derivative thus obtained is converted to the 11-acetoxy derivative (IV) and thence to the 16β-fluorinated derivative by treatment with dry silver fluoride in anhydrous isopropyl alcohol for about 2 to 3 hours at reflux in an inert atmosphere. The 16β - fluoro - 17,20; 20,21 - bismethylenedioxy derivative is isolated by filtration of the insolubles followed by extraction with methylene chloride. Excess silver fluoride is extracted with water. The methylene chloride solution is dried and the crude 17,20; 20,21-bismethylenedioxy derivative of 16β-fluoro-11-epihydrocortisone 11-acetate (V) recrystallized from dimethylformamide-water.

The 16β-fluoro-17,20; 20,21-bismethylenedioxy derivative thus obtained is converted to the 3-alkylene ketal by admixture with an alkanediol selected from the group of vicinal alkanediols or alkane-1,3-diols containing up to and including eight carbon atoms, in an organic solvent in the presence of an acid catalyst such as p-toluenesulfonic acid or zinc chloride. In the preferred embodiment of this invention, the 16β-fluoro-bismethylenedioxy derivative is mixed with ethylene glycol, benzene and para-toluenesulfonic acid monohydrate and the mixture refluxed and stirred for several hours with continuous removal of water. Upon completion of the reaction, the solution is cooled and made basic by addition of 5% aqueous sodium carbonate. The aqueous solution is extracted with a 1:1 benzene-ether solution, the organic layers separated, dried over a suitable drying agent, filtered and evaporated to give the corresponding 3-ketalized-Δ⁵-pregnene compound (VI).

In carrying out the epoxidation step, the 17,20; 20,21-bismethylenedioxy derivative of the 3-ketalized-11α-acetoxy-Δ⁵-pregnene compound (VI) is treated with a peracid, such as, peracetic or perbenzoic acid or other known epoxidizing agent to produce the 5α,6α-epoxide. A mixture of both the α- and β-oxides is produces in this epoxidation step and can be separated by chromatographic or crystallization techniques well known in the art. In the preferred embodiment of this invention, the bismethylenedioxy derivative of the 3-ketalized-11α-acetoxy-Δ⁵-pregnene compound is dissolved in chloroform and treated with perbenzoic acid at a temperature of about 0° C. to 5° C. for several hours followed by several hours at room temperature. The reaction mixture is then washed successively with 5% aqueous sodium bicarbonate and water. The chloroform layer is separated, dried over magnesium sulfate, filtered and evaporated to give the crude oxido mixture. Crystallization from methanol give the desired 5α,6α-epoxide (VII).

The 5α,6α-oxido compound upon treatment with boron trifluoride or other fluorinating agent yields the corresponding 17,20; 20,21-bismethylenedioxy derivative of 3,20 - diketo - 5α,11α,17α,21 - tetrahydroxy - 6β,16α - difluoro-allopregnane 3-ethylene ketal 11-acetate (VIII). The epoxide opening step can be performed under anhydrous or aqueous conditions in the presence of a catalyst, such as, boron trifluoride. When anhydrous conditions are employed, a temperature of about 0° C. to −20° C. is generally employed. The use of anhydrous conditions does not remove the 3-ketal or 11-acetoxy functions whereas, aqueous conditions results in elimination of both protective functions. When the hydrogen fluoride is produced in situ by the reaction of a metallic fluoride, such as, potassium bifluoride and an acid, reaction temperatures between zero to room temperature and even higher up to ninety degrees centigrade are useful. At low temperature, solvents, such as, chloroform methylene chloride, tetrahydrofuran are used. In the reaction of the epoxide with potassium bifluoride and an acid, organic acids are preferred, such as, acetic acid, propionic acid, formic acid or the like. However, other solvents, such as, neopentyl alcohol, isopropanol and the like with mineral acids, such as, sulfuric acid, perchloric acid or the like can be used. When potassium bifluoride is used, reaction times of twelve hours to five days are employed. After the reaction is terminated the material is isolated by neutralizing the excess of hydrogen fluoride present with a base, for example, sodium bicarbonate, potassium bicarbonate, sodium hydroxide or the like and extracting the product with water-immiscible solvents, such as, methylene chloride, chloroform, benzene, ether, hexane and the like. Evaporation of the organic solvents used gives the crude material which is purified generally by recrystallization from organic solvents, such as, methanol, ethanol, acetone, methylene chloride or the like. The 17,20; 20,21 bismethylenedioxy derivative of the 3,20-diketo - $5\alpha,11\alpha,17\alpha,21$ - tetrahydroxy - $6\beta,16\beta$ - difluoro-allopregnane 3-ethylene ketal 11-acetate obtained under anhydrous conditions is then hydrolyzed by means of aqueous perchloric, sulfuric or hydrochloric acids. In the preferred embodiment of the invention, the hydrolysis is conveniently conducted under relatively mild conditions, such as, room temperature, in dilute perchloric acid 10 to 30 minutes. The mixture is neutralized with sodium acetate, water is added and the product filtered, washed with water and dried. It is purified by recrystallization from a suitable organic solvent, such as, isopropyl ether.

The thus produced 3,20-diketo-$5\alpha,11\alpha,17\alpha,21$-tetrahydroxy - $6\beta,16\beta$ - difluoro - allopregnane - 17,20; 20,21-bismethylenedioxy derivative is then oxidized to the corresponding 11-keto compound by treatment in a suitable organic solvent with an oxidizing agent, such as, chromic acid, for a relatively brief period, generally about 15 to 60 minutes. In the preferred embodiment of this invention, an acetic acid solution of chromic acid is added to a solution of the 11-hydroxy compound in glacial acetic acid. After about a half-hour alcohol is added and the mixture concentrated to a syrup under reduced pressure. The desired 11-keto compound (IX) is isolated with chloroform and recrystallized from aqueous alcohol.

In the dehydration step, the said $5\alpha$-hydroxy-$6\beta,16\beta$-difluoro compound (IX) is dehydrated at the 4,5-positions in acid or alkaline media. Suitable acid dehydrating agents include mineral acids, such as, hydrochloric acid and sulphuric acid. In addition, acetic acid, acetic anhydride and paratoluene sulfonic acid serve as suitable dehydrating agents. Alkaline dehydrating agents include sodium potassium, calcium and barium hydroxides. In the preferred embodiment of this invention, acid dehydration is employed, preferably in the presence of acetic acid or hydrochloric acid. Depending on the amount of acid used, the $6\alpha$- and $6\beta$-isomers are obtained. The $6\beta$-isomer rearranges in the presence of strong acids to the $6\alpha$-isomer.

Alternatively, the hydrolysis and dehydration steps may be accomplished concomitantly by dissolving the 17,20; 20,21-bismethylenedioxy derivative of the 3-ketalized 3,20-diketo-$5\alpha,11\alpha,17\alpha,21$-tetrahydroxy - $6\beta,16\beta$ - difluoro-allopregnane 11-acetate (VIII) in an organic solvent, such as, chloroform and treating with a mineral acid. The solution is saturated with hydrogen chloride and shaken at about room temperature for from about 10 hours to about 20 hours. The reaction mixture is then washed with water and the solvent evaporated. The resulting bismethylenedioxy derivative of 3,20-diketo $5\alpha,11\alpha,17\alpha,21$-tetrahydroxy-$6\beta,16\beta$-difluoro-allopregnane is purified by recrystallization from a suitable organic solvent or by chromatography and then oxidized as described above to the corresponding 11-keto derivative (X). Here also, the $6\beta$- and $6\alpha$-isomers are obtained depending upon the amount of acid used. It is not necessary to separate the isomers. The reaction sequence can be performed as illustrated, since provisions for complete conversion to the $6\alpha$-isomer are included.

The bismethylenedioxy compound (X) is next converted to the 3-ketalized derivative (XI) by reaction with ethylene glycol as described above and then reduced with a chemical carbonyl reducing agent, such as, lithium aluminum hydride or sodium borohydride, in an organic solvent to produce the corresponding $6,16\beta$-difluoro-$\Delta^5$-pregnene-$11\beta,17\alpha,21$-triol-3,20 dione 3 ethylene ketal 17,20; 20,21-bismethylenedioxy compound. In the preferred embodiment of this invention, the 3-ketalized derivative (XI) is dissolved in ether and treated with an ethereal solution of sodium borohydride at about room temperature. Upon completion of this reaction, the reaction mixture is cautiously treated with water or a dilute mineral acid to decompose excess sodium borohydride and organo-metal complexes. The product is isolated by filtration followed by evaporation of the solvent and then hydrolyzed as described above to the 17,20; 20,21-bismethylenedioxy derivative of $6\beta,16\beta$-difluoro-hydrocortisone (XII).

The bismethylenedioxy function is then removed by hydrolysis with an aqueous organic acid, such as, formic and acetic acids. In the preferred embodiment of this invention, it is preferred to reflux the bismethylenedioxy derivative for a brief period, generally about 10 to 30 minutes, in 60% formic acid. The crude $6\beta,16\beta$-difluoro-corticosteroid (XIII) crystallizes upon the addition of water and concentration of the reaction mixture and is purified by recrystallization from a suitable organic solvent, such as, isopropyl ether. The difluoro-cortisone compound thus obtained consists of the $6\alpha$ and $6\beta$-fluoro isomers: the $6\alpha$-isomer can be separated by chromatographic or crystallization techniques well known in the art, if desired. Conversion of the $6\beta$-epimer or of mixtures consisting essentially of the $6\beta$-epimer to the $6\alpha$-epimer is accomplished by treatment of the 6-fluoro compound with a prototropic agent, such as, water, alcohols, organic acids and mineral acids. In the preferred embodiment of this invention the 21-acetate of the 6-fluoro compound, dissolved in chloroform and absolute methanol, is treated with anhydrous hydrogen chloride at −5° C. to −10° C. for about 3 hours. At the end of this period the reaction mixture is diluted with chloroform, washed successively with sodium bicarbonate and water and evaporated to dryness under reduced pressure. The $6\alpha,16\beta$-difluoro-hydrocortisone 21-acylate (XIII) is then recovered from the crude reaction product and purified by recrystallization.

It should be understood that the remaining reaction sequence applies equally well to the $6\alpha$- or the $6\beta$-fluoro compounds. The particular 6-fluoro substituent used depends only on the final product desired. When, of course, the $6\beta$-fluoro epimer of the final product is desired, the isomerization step is omitted.

Oxidation of the $6\alpha,16\beta$-difluoro-hydrocortisone 21-acetate in the manner described above produces $6\alpha,16\beta$-difluoro-cortisone. Selenium dioxide oxidation of $6\alpha,16\beta$-difluoro-hydrocortisone and of $6\alpha,16\beta$-difluoro-cortisone according to the procedure to be described below produces the corresponding $6\alpha,16\beta$-difluoro-prednisolone and $6\alpha,16\beta$-difluoro-prednisone compounds.

The $9\alpha$-halo and $9\alpha$-halo-21-acylate analogues of the $6\alpha,16\beta$-difluoro corticosteroids represented by the above generic formula are conveniently prepared, for example, by dehydrating 6α,16β-difluoro-hydrocortisone 21-acetate (XIII) at the 9(11)-positions. Suitable dehydrating agents are N-bromo-acetamide and anhydrous sulfur dioxide in pyridine, methanesulfonyl chloride, p-toluenesulfonyl chloride. In the preferred embodiment of this invention, a pyridine solution of the said 11-hydroxyl compound is treated with a pyridine solution of methanesulfonyl chloride at about 0° C. to −20° C. After one to four hours, the reaction mixture is allowed to come to room temperature and, following several hours at room temperature, is added dropwise to cold water to precipitate the 6α,16β-difluoro-$\Delta^{4,9(11)}$-pregnadiene-17α,21-diol-3,20-dione 21-acetate (XIV).

The said $\Delta^{4,9(11)}$-pregnadiene compound is then dissolved in an organic solvent, such as, dioxane, and reacted with a hypohalous acid, such as, hypobromous or hypochlorous acid, or with a hypohalous acid releasing agent in the presence of an acid. Such hypohalous acid releasing agents include N-bromo-acetamide, N-chloroacetamide, N-bromo-succinimide, N-iodosuccinimide, and N-chlorosuccinimide. Such agents permit the formation of a hypohalous acid in situ when treated with aqueous sulfuric acid, perchloric acid, and the like. The reaction is generally conducted at about room temperature using from equimolar up to 25% excess of hypohalous acid releasing agent. At the completion of reaction, generally not over 2 hours, the excess of hypohalous acid is destroyed by the addition of sodium sulfite or hyposulfite. The 9α-halo-11β-hydroxy derivative thus produced is isolated by the addition of water followed by filtration of the precipitated product or extraction with an organic solvent. Purification is accomplished by recrystallization from a suitable organic solvent such as, acetone. In the preferred embodiment of this invention the $\Delta^{4,9(11)}$-pregnadiene derivative is dissolved in dioxane and perchloric acid solution at room temperature, and treated with acid N-bromoacetamide. The reaction mixture is protected from light and, after 1 hour, the excess perchloric acid is destroyed by the addition of aqueous sodium sulfite. The 9α-bromo-6α,16β-difluoro-hydrocortisone 21-acetate (XV) is isolated as described above and purified by recrystallization from a suitable organic solvent.

Conversion of the 9α-bromo-6α,16β-difluoro-hydrocortisone 21-acetate (XV) to the corresponding 9α-fluoro compound is accomplished by treatment of said 9α-bromo compound to give the 9β,11β-epoxide derivative (XVI) by reaction with sodium or potassium carbonate or acetate at room temperature for several hours. The epoxide is recovered by the addition of water followed by evaporation of the alcohol under reduced pressure and extraction of the aqueous solution with chloroform. The product is purified by recrystallization from a suitable organic solvent, such as, acetone.

The 9β,11β-oxide is then treated with a fluorinating agent, such as, hydrogen fluoride, in a suitable organic solvent. The fluorinating agent used may be the gaseous hydrogen fluoride, a concentrated aqueous solution, or a metal fluoride which releases hydrogen fluoride when treated with acids. The epoxide-opening step can be performed under anhydrous or aqueous conditions in the presence or absence of a catalyst, e.g., boron trifluoride. Under anhydrous conditions temperatures between about minus forty and plus fifty degrees centigrade are generally employed, the preferred limits being between about zero and 25 degrees centigrade. If anhydrous conditions are difficult or inconvenient to maintain, the oxide-opening reaction can be performed under aqueous conditions. Thus aqueous hydrofluoric acid is admixed with a solution of the epoxide in an organic solvent, such as, for example, methylene chloride, chloroform, benzene, ether, and the like for a period of up to five hours, with one-half to two hours being the preferred reaction time. Room temperature is normally employed, but temperatures of zero to the boiling point of the mixture are operative. In the preferred embodiment of this invention, anhydrous conditions are employed. Thus, anhydrous hydrogen fluoride is passed into a methylene chloride solution of the epoxide at 0° C. to 5° C. After about two hours, the product, 6α,9α,16β-trifluoro-hydrocortisone 21-acetate (XVII), is recovered by evaporation of the solvent.

In a similar manner, the use of hydrogen chloride, hydrogen bromide or hydrogen iodide produces the respective chloride, bromo or iodo derivative.

Oxidation of the said hydrocortisone compound as described above produces 6α,9α,16β-trifluoro-cortisone 21-acetate. Dehydrogenation of the thus produced trifluoro-hydrocortisone and trifluoro-cortisone compounds is accomplished with excess selenium dioxide in a high boiling inert organic solvent, such as, phenetole, diethylene glycol diethylether, dibutyl cellosolve, xylene, dioxane, and so forth. A tertiary organic base may be added to expedite reaction. In the preferred embodiment of this invention the steroid compound, dibutylcellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the product isolated by crystallization from a suitable organic solvent or by chromatography on various adsorbents. In this manner, 6α,9α,16β-trifluoro prednisolone and 6α,9α,16β-trifluoroprednisone are produced.

The following examples are illustrative of the process and products of this invention. It should be remembered that these examples are given primarily by way of illustration and the invention in its broader aspects is not to be restricted to these examples.

EXAMPLE I

16α,17α-oxido-11-epicorticosterone 21-acetate

16α,17α-oxido-desoxycorticosterone is contacted with the oxygenating activity of an organism of the genus Pestolatia in aqueous nutrient medium in accordance with the procedure of Shull et al. U.S. Patent 2,721,163 to give 16α,17α-exido-11-epicorticosterone. Acetylation with acetic anhydride in pyridine produces the corresponding 21-acetate.

EXAMPLE II

16β-bromo-11-epihydrocortisone 21-acetate

To a solution of 16α,17α-oxido-11-epicorticosterone 21-acetate (2 g.) in glacial acetic acid (75 ml.) is added 30% hydrobromic acid (3.2 ml.) in glacial acetic acid. After 15 minutes at 15° C. water (75 ml.) is added to precipitate 16β-bromo-11-epihydrocortisone 21-acetate. The product is filtered, washed with water and dried in a vacuum desiccator at 40° C.

EXAMPLE III

16β-bromo-11-epihydrocortisone

To a suspension of 16β-bromo-11-epihydrocortisone 21-acetate (5 g.) in chloroform (50 ml.), methanol (175 ml.), and water (20 ml.) is added concentrated hydrochloric acid (20 ml.). After ten hours at room temperature the reaction mixture is concentrated under reduced pressure at 30° C. to 35° C. with simultaneous addition of water. The product, 16β-bromo-11-epihydrocortisone is removed by filtration and used directly in the preparation of Example IV. It may be dried in a vacuum desiccator at 40° C.

EXAMPLE IV

17,20; 20,21-bismethylenedioxy derivative of 16β-bromo-11-epihydrocortisone

16β-bromo-11-epihydrocortisone (5 g.) is dissolved in methylene chloride (58 ml.) and treated with 37% aqueous formaldehyde (50 ml.) and concentrated hydrochloric acid (50 ml.). The two phase system is stirred rapidly at room temperature for 16 hours. During this period most of the methylene chloride distills off and is replaced with hexane (350 ml.). The product, the 17,20; 20,21-bismethylenedioxy derivative of 16β-bromo-11-epihydrocortisone, is isolated by separating the two liquid phases, extracting the aqueous phase with one-half its volume of hexane and washing the combined hexane solutions successively with four separate portions of water in the proportions of ¼ volume of water per volume of hexane solution. The hexane solution is then dried with anhydrous magnesium sulfate, filtered and evaporated under reduced pressure to give the crude product which is recrystallized from methylene chloride-methanol.

EXAMPLE V

*17,20; 20,21-bismethylenedioxy derivative of 16β-bromo-11-epihydrocortisone 11-acetate*

To 10 g. of 17, 20; 20,21-bismethylenedioxy derivative of 16β-bromo-11-epihydrocortisone is added 300 ml. of pyridine and 300 ml. of acetic anhydride. The mixture is allowed to stand for 20 hours at room temperature and 1,200 ml. of water is added. After one hour, the mixture is chilled to precipitate the 11α-acetoxy derivative.

EXAMPLE VI

*17,20; 20,21-bismethylenedioxy derivative of 16β-fluoro-11-epihydrocortisone 11-acetate*

30 gms. of dried silver fluoride is added in portions to 10 gms. of 17,20; 20,21-bismethylenedioxy derivative of 16β-bromo-11-epihydrocortisone 11-acetate in 500 ml. of refluxing anhydrous isopropyl alcohol at reflux under an inert atmosphere of nitrogen. The isopropyl alcohol is dried by distillation from aluminum isopropoxide. After two hours at reflux, the insoluble matter is filtered and the product extracted with methylene chloride. Excess silver fluoride is removed by water extraction. The dry solution is then concentrated and the residue recrystallized from dimethylformamide-water.

EXAMPLE VII

*17,20; 20,21-bismethylenedioxy-16β-fluoro-Δ⁵-pregnene-11α,17α,21-triol-3,20-dione 3-ethylene ketal-11-acetate*

The 17,20; 20,21-bismethylenedioxy derivative of 16β-fluoro-11-epihydrocortisone 11-acetate (150 g.), benzene (2.25 l.) and ethylene glycol (50 ml.) are thoroughly mixed and heated to remove a small amount of water by azeotropic distillation. Paratoluenesulfonic acid monohydrate (5.0 gr.) is added and the mixture stirred and refluxed for 20 hours with continuous removal of water. The mixture is then cooled, made basic by the addition of 5% aqueous sodium carbonate, and extracted with a 1:1 solution of benzene and ether. The organic layer is separated, dried over anhydrous magnesium sulfate, filtered and evaporated under reduced pressure to give 16β-fluoro-Δ⁵-pregnene-11α,17α,21-triol, 3,20-dione 3-ethylene ketal-11-acetate-17,20; 20,21-bismethylenedioxy derivative.

EXAMPLE VIII

*17,20; 20,21-bismethylenedioxy derivative of 3,20-diketo-5α,6α-oxido-11α,17α,21-trihydroxy - 16β - fluoro - pregnane 3-ethylene ketal 11-acetate*

To a solution of the 17,20; 20,21-bismethylenedioxy derivative of 16β-fluoro-Δ⁵-pregnene-11α, 17α,21-triol-3,20-dione 3-ethylene ketal 11-acetate (50 g.) in chloroform (1.0 l.) is added a chilled solution of perbenzoic acid (19 g.) dissolved in chloroform (325 ml.). After 24 hours at about 5° C. followed by 72 hours at room temperature, the solution is washed with 5% aqueous sodium bicarbonate and then with water. The chloroform layer is separated, dried and evaporated to give the crude epoxide. Recrystallization from methanol gives pure 3,20-diketo-5α,6α-oxido-11α,17α,21-trihydroxy - 16β-fluoro-pregnane- 3-ethylene ketal 11-acetate 17,20; 20,21-bismethylenedioxy derivative.

EXAMPLE IX

*17,20; 20,21-bismethylenedioxy derivative of 3,20-diketo-5α,11α,17α,21 - tetrahydroxy - 6β,16β - difluoro - allopregnane 3-ethylene ketal 11-acetate*

A solution of the product of Example VIII (10 g.) in acetic acid (70 ml.) and acetic anhydride (5 ml.) is stirred for two days at room temperature with potassium bifluoride (21 g.). The mixture is then diluted with methylene chloride (500 ml.) and the resulting solution washed three times with equal volumes of water. The methylene chloride solution is dried over anhydrous sodium sulfate, evaporated to dryness to give the bismethylenedioxy derivative of 3,20 - diketo - 5α,11α,17α,21-tetrahydroxy-6β,16β-difluoro-allopregnane 3-ethylene ketal 11-acetate.

In like manner, 3,20 - diketo - 5α,11α,17α,21 - tetrahydroxy-6α-chloro-16β-fluoro-allopregnane 3-ethylene ketal 11-acetate is prepared using hydrogen chloride as the halogenating agent.

EXAMPLE X

*17,20; 20,21-bismethylenedioxy derivative of 3,20-diketo-5α,11α,17α,21-tetrahydroxy-6β,16β-difluoro-allopregnane*

A suspension of the product of Example IX (5 g.) in 0.25 N methanolic perchloric acid (100 ml.) is shaken at room temperature for 20 hours. Water is then added and the resulting product filtered and washed carefully with sodium acetate solution followed by water. The crude 17,20; 20,21-bismethylenedioxy derivative of 3,20-diketo-5α,11α,17α,21 - tetrahydroxy - 6β,16β - difluoro-allopregnane is used directly in the following preparation.

EXAMPLE XI

*17,20; 20,21 - bismethylenedioxy derivative of 3,11,20-triketo - 5α,17α,21 - trihydroxy - 6β,16β - difluoro-allopregnane*

The product of Example X (5 g.) is oxidized in glacial acetic acid (200 ml.) with chromium trioxide (1.2 g.) for 45 minutes. Alcohol (50 ml.) is added and the mixture concentrated to a syrup. The product is isolated with chloroform and the chloroform residue recrystallized from 95% alcohol.

EXAMPLE XII

*6β,16β-difluoro-cortisone-17,20; 20,21-bismethylenedioxy derivative*

The product of Example XI (10 g.) is heated to reflux in acetic acid (500 ml.) and water (1.0 ml.) for one hour, then cooled, diluted with 500 ml. of water and evaporated to dryness under reduced pressure. The residue of crude 6β,16β-difluoro-cortisone-17,20; 20,21-bismethylenedioxy derivative is used directly in the following example.

EXAMPLE XIII

*17,20; 20,21-bismethylenedioxy derivative of 6β,16β-difluoro-Δ⁵-pregnene-17α,21-diol-3,11,20 - dione 3 - ethylene ketal*

The product of Example XII is reacted with ethylene glycol in benzene in the presence of paratoluenesulfonic acid according to the procedure of Example VII to give the corresponding 3-ketalized compound.

EXAMPLE XIV

*17,20; 20,21-bismethylenedioxy derivative of 6β,16β-difluoro-Δ⁵-pregnene-11β,17α,21-triol-3,20-dione 3 - ethylene ketal*

To a solution of the product of Example XIII (50 gms.) in anhydrous ether (22 l.) is gradually added a solution of sodium borohydride (100 gms.) in ether (20 l.) over a period of about 2 hours. Water (2.1) is then slowly added and the ether phase separated. The aqueous phase is extracted with ethylacetate and the extract added to the ether phase. The combined ether-ethylacetate solution is washed with water, dried and evaporated to dryness under reduced pressure. The product is used directly in the following example.

EXAMPLE XV

*17,20; 20,21-bismethylenedioxy derivative of 6β,16β-difluoro-hydrocortisone*

Hydrolysis of the product of Example XIV according to the procedure of Example X produces the desired 6β-16α-difluoro-hydrocortisone bismethylenedioxy derivative.

EXAMPLE XVI

*6β,16β-difluoro-hydrocortisone 21-acetate*

10 g. of the 17,20; 20,21-bismethylenedioxy derivative of 6β,16β-difluoro-hydrocortisone is refluxed for approximately 30 minutes in 60% formic acid (2 l.). Water (1,600 ml.) is then added and the solution concentrated at room temperature under reduced pressure. The crude 6β,16β-difluorohydrocortisone which crystallizes from the solution is recrystallized from isopropyl ether. Acetylation of the 21-alcohol with acetic anhydride in pyridine produces the corresponding 21-acetate.

EXAMPLE XVII

*6α,16β-difluoro-hydrocortisone 21-acetate*

Into a solution of 6β,16β-difluoro-hydrocortisone 21-acetate (10 g.) in chloroform (850 ml.) and absolute alcohol (7 ml.) at $-5°$ C. to $-10°$ C., a stream of anhydrous hydrochloric acid is bubbled for about 3 hours. At the end of this period, the solution is diluted with chloroform (1.5 l.), washed successively with sodium bicarbonate and water, dried and evaporated to dryness under reduced pressure at 35–45° C. The residue, 6α,16β-difluorohydrocortisone 21-acetate is recrystallized from acetone-Skellysolve B. Acid hydrolysis gives the corresponding 21-alcohol.

EXAMPLE VIII

*6α,16β-difluoro-cortisone 21-acetate*

Oxidation of 6α,16α-difluoro-hydrocortisone 21-acetate (5 g.) with chromium trioxide in glacial acetic acid as described in Example XI produces 6α,16β-difluoro-cortisone 21-acetate.

Hydrolysis of the 21 acetate according to the procedure of Example III gives 6α,16β-difluoro-cortisone.

EXAMPLE XIX

*6α,16β-difluoro-$\Delta^{4,9(11)}$-pregnadiene-17α,21-diol-3,20-dione 21-acetate*

To a solution of the 6α,16β-difluoro-hydrocortisone 21-acetate (11 g.) in anhydrous pyridine (240 ml.) cooled to 0° C., and protected from atmospheric moisture, is added a solution of methanesulfonyl chloride (20.6 ml.) in chloroform (32 ml.). After about one hour at 0° C., the mixture is allowed to come to room temperature and left standing for ten hours. The solution is then added dropwise to 2.2 l. of ice water with stirring to precipitate 6α,16β - difluoro-$\Delta^{4,9(11)}$-pregnadiene-17α,21-diol-3,20-dione 21-acetate. The product is recovered by filtration, dried and recrystallized from ethylacetate.

EXAMPLE XX

*6α,16β-difluoro-9α-bromo-$\Delta^4$-pregnene-11β,17α,21-triol-3,20-dione 21-acetate*

Solid N-bromoacetamide (3.8 g.) is added with stirring to a suspension of 6α,16β-difluoro-$\Delta^{4,9(11)}$-pregnadiene-17α,21-diol-3,20-dione 21-acetate (8 g.) and 0.46 N perchloric acid (12 ml.) in peroxide-free dioxane (300 ml.) at room temperature over a period of about one hour. The reaction mixture is protected from light during the addition and for an additional hour. 10% aqueous sodium sulfite is added with stirring until KI-starch paper no longer turns blue. Ice (330 g.) and chloroform (825 ml.) is added and the layers separated. The chloroform dioxane solution is washed with water, then concentrated to a syrup in vacuo at room temperature. The addition of acetone (350 ml.) to the syrup causes rapid crystallization. The mixture is chilled overnight, then filtered. Additional product is recovered from the filtrate by evaporation to dryness. Recrystallization from acetone gives pure 6α,16β - difluoro-9α-bromo-$\Delta^4$-pregnene-11β,17α,21-triol-3,20-dione 21-acetate.

EXAMPLE XXI

*6α,16β-difluoro-9β,11β-oxido-$\Delta^4$-pregnene-17α,21-diol-3,20-dione 21-acetate*

A solution of 6α,16β-difluoro-9α-bromo-$\Delta^4$-pregnene-11β,17α,21-triol-3,20-dione 21-acetate (8 g.) in dioxane (260 ml.) is added to a solution of anhydrous potassium acetate (5.5 g.) in absolute alcohol (55 ml.) heated to near reflux temperature. The mixture is heated to reflux for about 45 minutes and then cooled rapidly. The product, 6α,16β - difluoro - 9β,11β-oxido-$\Delta^4$-pregnene-17α,21-diol-3,20-dione 21-acetate, is precipitated by the addition of ice-water and filtered. Concentration of the filtrate permits isolation of additional product.

EXAMPLE XXII

*6α,9α,16β-trifluoro-hydrocortisone 21-acetate*

Approximately 6 g. of anhydrous hydrogen fluoride is passed into a solution of 6α,16β-difluoro-9β,11β-oxido-$\Delta^4$-pregnene-17α,21-diol-3,20-dione 21-acetate (5 g.) in redistilled chloroform (100 ml.) contained in a polyethylene bottle at 0° C. The mixture becomes an intense red color and separates into two layers. After 1–5 hours at 0° C., the mixture is made weakly alkaline by the addition of sodium bicarbonate solution. The chloroform layer is separated and evaporated to dryness to give the crude 6α,9α,16β-trifluorohydrocortisone 21-acetate. The product is recrystallized from ethylacetate.

By slight modifications of the above procedure the 9α-bromo derivative is prepared. The 9α-bromo derivative obtained by this procedure is identical to the 6α,16β-difluoro - 9α-bromo-$\Delta^4$-pregnene-11β,17α-21-triol-dione 21-acetate obtained in Example XX.

EXAMPLE XXIII

*6α,9α,16β-trifluoro-cortisone*

Oxidation of 6α,9α,16β-trifluoro-hydrocortisone 21-acetate with chromium trioxide in acetic acid according to the procedure of Example XI produces 6α,9α,16β-trifluoro-cortisone 21-acetate. Hydrolysis according to the procedure of Example III gives the corresponding 21-alcohol.

EXAMPLE XXIV

*6α,9α,16β-trifluoro-prednisolone*

A mixture of 6α,9α,16β-trifluoro hydrocortisone 21-acetate (0.1 g.), freshly sublimed selenium dioxide (0.1 g.) and 2 ml. of dibutyl cellosolve is heated in a nitrogen atmosphere for about 10 hours at 175° C. The brown supernatant solution is decanted from the residual solid and cooled to room temperature. The addition of low boiling petroleum ether precipitates 6α,9α,16β-trifluoro-prednisolone 21-acetate which is purified by chromatographic separation on a Florisil (synthetic magnesium silicate) column. Acid hydrolysis according to the procedure of Example III gives 6α,9α,16β-trifluoro-prednisolone.

In like manner, 6α,16β-difluoro-prednisone; 6α,16β-difluoro-prednisolone; 6α,9α,16β-trifluoro-prednisone; 6α-chloro - 16β - fluoro prednisolone; 6α-chloro-16β-fluoro-prednisone; 6α-chloro-9α,16β-difluoro-prednisolone and 6α-chloro-9α,16β-difluoro prednisone are prepared.

EXAMPLE XXV

When the 17,20; 20,21-bismethylenedioxy derivative of 3,20 - diketo - 5α,11α,17α,21-tetrahydroxy-6β-chloro-16β-fluoro-allopregnane 3-ethylene ketal 11-acetate of Example IX is utilized in Examples X through XXIV in place of the analogous 6β-fluoro product, there results the corresponding 6β-chloro-substituted intermediates and the end-products:

- 6α-chloro-16β-fluoro-hydrocortisone
- 6α-chloro-16β-fluoro-cortisone
- 6α-chloro-9α,16β-difluoro-hydrocortisone
- 6α-chloro-9α,16β-difluoro-cortisone
- 6α-chloro-16β-fluoro-prednisolone
- 6α-chloro-16β-fluoro-prednisone
- 6α-chloro-9α,16β-difluoro-prednisolone
- 6α-chloro-9α,16β-difluoro-prednisone A variety of 21-esters of the difluoro and trifluoro corticosteroid products are prepared using acyl chlorides or acyl anhydrides as acylating agents in accordance with conventional methods. These include such esters as the formate, the propionate, the isobutyrate, the hexanoate, the octanoate, the benzoate and the succinate.

What is claimed is:

1. A compound selected from the group consisting of those having the formula:

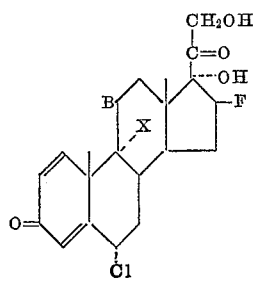

and

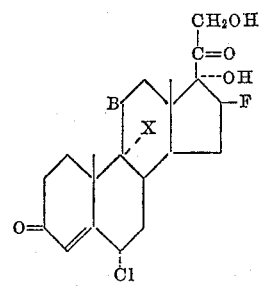

wherein B is selected from the group consisting of carbonyl and β-hydroxymethylene radicals and X is selected from the group consisting of hydrogen and fluorine; and the 21-acylates thereof wherein the acyl radical is that of a hydrocarbon carboxylic acid containing from one to eight carbon atoms, inclusive.

2. 6α-chloro-16β-fluoro-hydrocortisone.
3. 6α-chloro-16β-fluoro-prednisolone.
4. 6α-chloro-9α,16β-difluoro-hydrocortisone.
5. 6α-chloro-9α,16β-difluoro-prednisolone.
6. 6α,16β-difluoro-Δ$^{4,9(11)}$-pregnadiene-17α,21-diol-3,20-dione.
7. The 17,20; 20,21-bismethylenedioxy derivative of 3, 20 - diketo - 5α,6α - oxido - 11α,17α,21 - trihydroxy - 16β-fluoro-pregnane-3-ethylene ketal 11-acetate.
8. The 17,20; 20,21-bismethylenedioxy derivative of 16β-fluoro-11-epihydrocortisone-11-acetate.
9. The 17,20; 20,21-bismethylenedioxy derivative of 16β-bromo-11-epihydrocortisone.
10. 6α,16β - difluoro - Δ$^{4,9(11)}$ - pregnadiene - 17α,21-diol-3,20-dione-21-acetate.

References Cited in the file of this patent

UNITED STATES PATENTS 2,781,366    Schneider   ------------ Feb. 12, 1957

OTHER REFERENCES

Edwards et al.: J.A.C.S., vol. 81 (1959), pp. 3156–57 relied on.

UNITED STATES PATENT OFFICE
CERTIFICATION OF CORRECTION

Patent No. 3,022,295                               February 20, 1962

Rudolph G. Berg et al.

It is hereby certified that error appears in the above numbered patent requiring correction and that the said Letters Patent should read as corrected below.

In the heading to the printed specification, in the title of invention, line 2, for "16β-DIFLUORINATED" read -- 16β-FLUORINATED --; column 7, line 38, for "-epicorticorterone" read -- -epicorticosterone --; column 8, line 71, for "16α" read -- 16β --; column 14, line 19, for "6α" read -- 6β --; line 61, for "-dione", in italics, read -- -trione --; in italics; column 15, lines 14 and 45, for 16α", each occurrence, read -- 16β --; line 42, for "EXAMPLE VIII" read -- EXAMPLE XVIII --; column 16, line 45, after "-triol" insert -- —3,20 --.

Signed and sealed this 26th day of June 1962.

(SEAL)
Attest:

ERNEST W. SWIDER                                          DAVID L. LADD
Attesting Officer                                               Commissioner of Patents